(12) United States Patent
Khan et al.

(10) Patent No.: US 9,538,573 B2
(45) Date of Patent: Jan. 3, 2017

(54) SYSTEMS AND METHODS FOR MANAGING CALL CONNECTIONS FROM NON-ORIGINATING NODES IN NETWORKS

(71) Applicants: Waseem Reyaz Khan, Gurgaon (IN); Piyush Sharma, Gurgaon (IN); Alwyn Joy George, New Delhi (IN); Rajagopalan Kannan, Gurgaon (IN)

(72) Inventors: Waseem Reyaz Khan, Gurgaon (IN); Piyush Sharma, Gurgaon (IN); Alwyn Joy George, New Delhi (IN); Rajagopalan Kannan, Gurgaon (IN)

(73) Assignee: Ciena Corporation, Hanover, MD (US)

( * ) Notice: Subject to any disclaimer, the term of this patent is extended or adjusted under 35 U.S.C. 154(b) by 293 days.

(21) Appl. No.: 14/340,678

(22) Filed: Jul. 25, 2014

(65) Prior Publication Data
US 2015/0365294 A1    Dec. 17, 2015

(30) Foreign Application Priority Data

Jun. 13, 2014   (IN) .......................... 1605/DEL/2014

(51) Int. Cl.
*H04W 76/02* (2009.01)
*H04W 76/06* (2009.01)
(Continued)

(52) U.S. Cl.
CPC ........ *H04W 76/025* (2013.01); *H04L 65/1066* (2013.01); *H04L 67/00* (2013.01);
(Continued)

(58) Field of Classification Search
CPC .... H04W 76/00; H04W 76/02; H04W 76/021; H04W 76/025; H04W 76/027; H04W 76/028; H04W 76/04; H04W 76/045; H04W 76/06; H04W 76/064; H04W 76/066
See application file for complete search history.

(56) References Cited

U.S. PATENT DOCUMENTS 7,391,720 B1   6/2008   Kuditipudi et al.
7,580,401 B2   8/2009   Shew et al.
(Continued)

OTHER PUBLICATIONS

"Generalized Multi-Protocol Label Switching (GMPLS) Architecture," E. Mannie, Ed., Oct. 2004, pp. 1-69.
(Continued)

*Primary Examiner* — Ashley Shivers
(74) *Attorney, Agent, or Firm* — Clements Bernard PLLC; Christopher L. Bernard; Lawrence A. Baratta, Jr.

(57) ABSTRACT

A method for performing an operation at a non-originating node of a connection includes receiving a request for the operation; determining information associated with the connection; and signaling, based on the information and the operation, an originating node to cause the originating node to perform call connection management on the connection. A non-originating node includes a plurality of ports with at least one connection thereon; and a controller communicatively coupled to the plurality of ports and operating a control plane, wherein, for an operation of call connection management on the at least one connection, the controller is configured to: determine information associated with the at least one connection on a link formed by a port; and signal, based on the information and the operation, an originating node of the at least one connection to perform the call connection management on the at least one connection.

18 Claims, 6 Drawing Sheets

(51) Int. Cl.
*H04W 76/04* (2009.01)
*H04L 29/08* (2006.01)
*H04L 29/06* (2006.01)

(52) U.S. Cl.
CPC ....... *H04L 67/2804* (2013.01); *H04W 76/021* (2013.01); *H04W 76/027* (2013.01); *H04W 76/045* (2013.01); *H04W 76/064* (2013.01)

(56) References Cited

U.S. PATENT DOCUMENTS

| | | | |
|---|---|---|---|
| 7,738,359 | B1 | 6/2010 | Suryaputra et al. |
| 8,259,733 | B2 | 9/2012 | Conklin et al. |
| 8,402,121 | B2 | 3/2013 | Skalecki et al. |
| 8,457,001 | B2 | 6/2013 | Madrahalli et al. |
| 8,509,055 | B2 | 8/2013 | Khan et al. |
| 8,553,707 | B2 | 10/2013 | Swinkels et al. |
| 8,666,247 | B2 | 3/2014 | Srinivasan et al. |
| 8,682,160 | B2 | 3/2014 | Prakash et al. |
| 2007/0091826 | A1* | 4/2007 | Chandra ............. H04L 12/5601 370/255 |
| 2008/0112322 | A1* | 5/2008 | Bardalai ............. H04L 12/5695 370/235 |
| 2008/0130677 | A1 | 6/2008 | Attarwala et al. |
| 2008/0212497 | A1 | 9/2008 | Getachew et al. |
| 2010/0118878 | A1 | 5/2010 | Skalecki et al. |
| 2013/0242721 | A1* | 9/2013 | Moynihan ........... H04L 41/0659 370/225 |
| 2014/0029416 | A1* | 1/2014 | Ceccarellli ............. H04L 45/22 370/225 |
| 2014/0126899 | A1 | 5/2014 | Prakash et al. |
| 2015/0200838 | A1* | 7/2015 | Nadeau ................. H04L 45/124 398/58 |

OTHER PUBLICATIONS

"Architecture for the automatically switched optical network (ASON)," International Telecommunication Union, Jun. 2006, pp. 1-104.

* cited by examiner

SYSTEMS AND METHODS FOR MANAGING CALL CONNECTIONS FROM NON-ORIGINATING NODES IN NETWORKS

FIELD OF THE DISCLOSURE

The present disclosure relates generally to networking systems and methods. More particularly, the present disclosure relates to systems and methods for managing call connections from non-originating nodes in networks.

BACKGROUND OF THE DISCLOSURE

Optical network control planes provide automatic allocation of network resources in an end-to-end manner. Exemplary control planes may include Automatically Switched Optical Network (ASON) as defined in G.8080/Y.1304, Architecture for the automatically switched optical network (ASON), the contents of which are herein incorporated by reference; Generalized Multi-Protocol Label Switching (GMPLS) Architecture as defined in Request for Comments (RFC): 3945 and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at one or more layers, and establishing connections there between. As described herein, these control planes may be referred to as control planes as they deal with routing signals at Layers 0, 1, and 2, i.e., photonic signals, time division multiplexing (TDM) signals such as, for example, Synchronous Optical Network (SONET), Synchronous Digital Hierarchy (SDH), Optical Transport Network (OTN), Ethernet, MPLS, and the like. Control planes are configured to establish end-to-end signaled connections such as sub-network connections (SNCs) in ASON or OSRP and label switched paths (LSPs) in GMPLS and MPLS. Control planes use the available paths to route the services and program the underlying hardware accordingly.

In operation, an optical network operating a control plane includes interconnected network elements that exchange information with one another via control plane signaling. As such, each network element has a routing database with up-to-date information about the network, e.g., topology, bandwidth utilization, etc., that enables path computation at a connection's source node (i.e., an originating node). Once a path is computed for the connection, the source or originating node performs call connection management to set up the connection in the network. Conventionally, call connection management is solely triggered from the originating node, i.e., the originating node computes the path and signals the path in the network, and upon a failure, the originating node redials the connection. The fact that call connection management is only handled by the originating node is restrictive making call connection user operations cumbersome especially those which require moving a connection away from its working path, or network management operations performed on the basis of link/line state or link/line utilization. For example, user operations can include, without limitation, Manual Switch to Protect, Regroom, Manual Revert and Configure, etc. With the conventional techniques, performing such user operations requires operators to search for a related call connection when decisions are made based on link/line utilization or state. This is cumbersome and impractical. Thus, it would be advantageous to support non-originating node call connection management.

BRIEF SUMMARY OF THE DISCLOSURE

In an exemplary embodiment, a method for performing an operation at a non-originating node of a connection includes receiving a request for the operation; determining information associated with the connection; and signaling, based on the information and the operation, an originating node to cause the originating node to perform call connection management on the connection. The operation can include any one or more of regroom, manual switch to protect, revert, and configure. The signaling can be performed through a control plane including any of Automatically Switched Optical Network (ASON), Generalized Multi-Protocol Label Switching (GMPLS), and Optical Signaling and Routing Protocol (OSRP). The control plane can be configured such that the call connection management is performed by the originating node, and wherein the non-originating node can perform the call connection management through the originating node. The signaling can utilize control plane signaling messages with data included therein in Information Elements to trigger the operation to perform the call connection management.

The control plane signaling messages can include notify messages or release messages. The determining is performed by searching, based on a connection identifier, managed objects stored at the non-originating node. The connection identifier can include a Network Call Correlation Identification (NCCI). The originating node can perform the operation on the connection subsequent to receiving the signaling by the non-originating node; and the method can further include receiving signaling from the originating node with one of a notification and a release based on the operation with a status included therein. The connection can include one of a Subnetwork Connection (SNC) or a Label Switched Path (LSP). The request can be received from a Software Defined Networking (SDN) controller. The operation can be a manual switch to protect to free up bandwidth on a link.

In an exemplary embodiment, a non-originating node includes a plurality of ports with at least one connection thereon; and a controller communicatively coupled to the plurality of ports and operating a control plane, wherein, for an operation of call connection management on the at least one connection, the controller is configured to: determine information associated with the at least one connection on a link formed by a port; and signal, based on the information and the operation, an originating node of the at least one connection to perform the call connection management on the at least one connection. The operation can include any one or more of regroom, manual switch to protect, revert, and configure. The control plane can include any of Automatically Switched Optical Network (ASON), Generalized Multi-Protocol Label Switching (GMPLS), and Optical Signaling and Routing Protocol (OSRP); and the control plane can be configured such that the call connection management is performed by the originating node, and the non-originating node can cause performance of the call connection management through the originating node.

The non-originating node can utilize control plane signaling messages with data included therein in Information Elements to trigger the operation to perform the call connection management. The non-originating node can be configured to search through managed objects, based on a connection identifier, to determine information associated with the connection. To perform the operation in the call connection management, the non-originating node can be configured to: determine information associated with the connection; signal, based on the information and the operation, the originating node to perform the call connection management on the connection; and receive a status signal from the originating node. The operation can be a configure operation including any of changing a Tandem Connection Monitoring number of the connection, converting a Subnetwork Connection (SNC) to a Permanent SNC (PSNC) or mesh SNC, and editing any editable call connection parameters of the connection.

In yet another exemplary embodiment, an originating node includes a plurality of ports with at least one connection thereon; and a controller communicatively coupled to the plurality of ports and operating a control plane, wherein, for an operation of call connection management on the at least one connection, the controller is configured to: receive a signaling message from a non-originating node on a port and perform the call connection management based thereon; and signal a status to the non-originating node.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
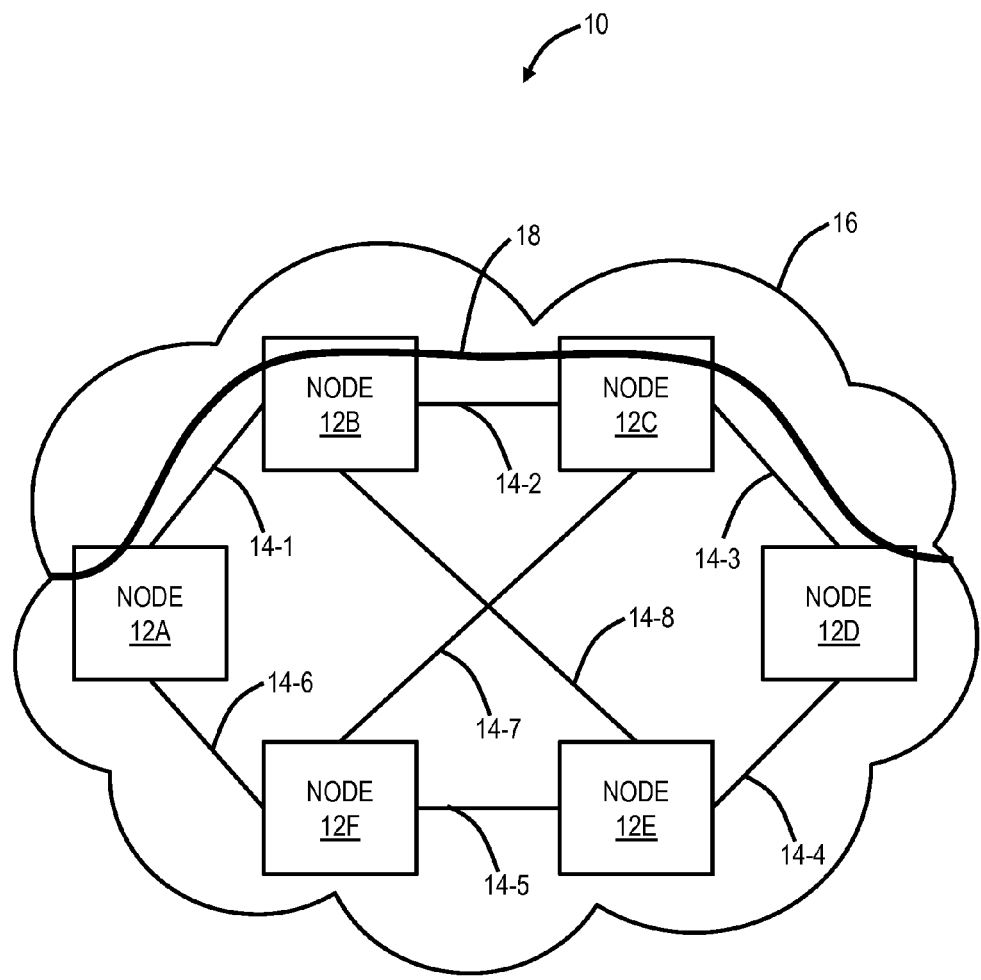
FIG. 1 is a network diagram of a network of a plurality of nodes interconnected by a plurality of links and operating a control plane.

In various exemplary embodiments, systems and methods for managing call connections from non-originating nodes in networks perform call connection operations from any node a connection traverses. By providing a flexibility to perform user operations on In-Service connections from any traversing node, the systems and methods simplify network management and operation. The systems and methods can include, at a non-originating node, retrieving all the call connections on a link or a line by fetching the unique Network Call Correlation Identification (NCCI) from a call control connection point associated with each connection on the specified link/line. On receiving an operation request on a selected connection, a Notify signaling message can be sent towards the originating node indicating the kind of user operation requested. Additional user parameters are passed, if required, through new signaling IEs (Information Elements) within the Notify message. On receiving the Notify message, the originating node internally triggers the user operation by posting a message to the call connection object. Once the operation is complete as either success or failure, this is notified back as an acknowledgement to the node which initiated the request. An error code within the Notify ACK message indicates the status of the operation. Thus, the non-originating node can trigger the user operations by messaging to the originating node, i.e., the originating node still manages the call connection operations, but the non-originating node can trigger operations.

The systems and methods are contemplated in any application. Apart from ease of network management, some example applications can include simplifying Software Defined Networking (SDN) application design, Regrooming/Configuring connection parameters based on link state, Switching call connection paths based on link utilization, etc. For the SDN application design, in a hybrid SDN/Control Plane model, SDN applications triggering call connection operations require searching for originating nodes for each SNC prior to issuing the operation. By enabling operations for a connection (e.g., SNC, LSP) from any node it traverses, SDN application design does not require any additional intelligence to issue operations on call connection, hence removing this explicit constraint in their design. For Regrooming/Configuring connection parameters based on link state, there is often a requirement to regroom a connection (e.g., SNC, LSP) based on link/line state. Considering the probability of a link/line going bad is high and the operator wishes to enable RHP (Reserved Home Path) on all connections traversing this link, traditionally, the operator would find out all calls traversing through this link/line, find its originating node and trigger a regroom operation. With the systems and methods described herein, the operator could trigger the operation from any node connected to this link/line. By providing flexibility to regroom/configure any parameters like Tandem Connection Monitoring (TCM) number, converting SNC to a permanent SNC (PSNC) or mesh SNC and all other call connection editable parameters, network management becomes simpler especially in large networks. For switching call connection path based on link utilization, in scenarios where a link bandwidth needs to be freed, one or more connections traversing the link/line can be selected and issued a Manual Switch to protect, providing flexibility for manual bandwidth management to the operators.

Referring to FIG. 1, in an exemplary embodiment, a network diagram illustrates a network 10 of a plurality of nodes 12A, 12B, . . . , 12F interconnected by a plurality of links 14-1, 14-2, . . . , 14-8 and operating a control plane 16. The nodes 12A-12F can be network elements such as optical switches, add/drop multiplexers, cross-connects, etc. that operate the control plane 16 (e.g., ASON, GMPLS, OSRP, etc.) and provide signaled connections therebetween (e.g., SNCs, LSPs, etc.). In the context of the control plane, the nodes 12A-12F flood routing information to one another and store such information in an associated routing database. The control plane 16 is used to establish connections via call connection management which, conventionally in the control plane 16, is only performed by an originating node 12 (note, from a terminology perspective the originating node can also be a source node). For example, assume the network 10 includes an SNC 18 with the originating node being the node 12A. Note, while described herein with reference to SNC connections, those of ordinary skill in the art will recognize the systems and methods contemplate operation with LSPs or other signaled connections by the control plane. So, for example, if an SNC or LSP is required in the network 10, the originating node 12 computes a path and sends a setup message to the nodes in the path (e.g., the nodes 12B, 12C, 12D). Thus, in this example of FIG. 1, the non-originating nodes 12 for the SNC 18 include the nodes 12B, 12C, 12D.

Figure 6:
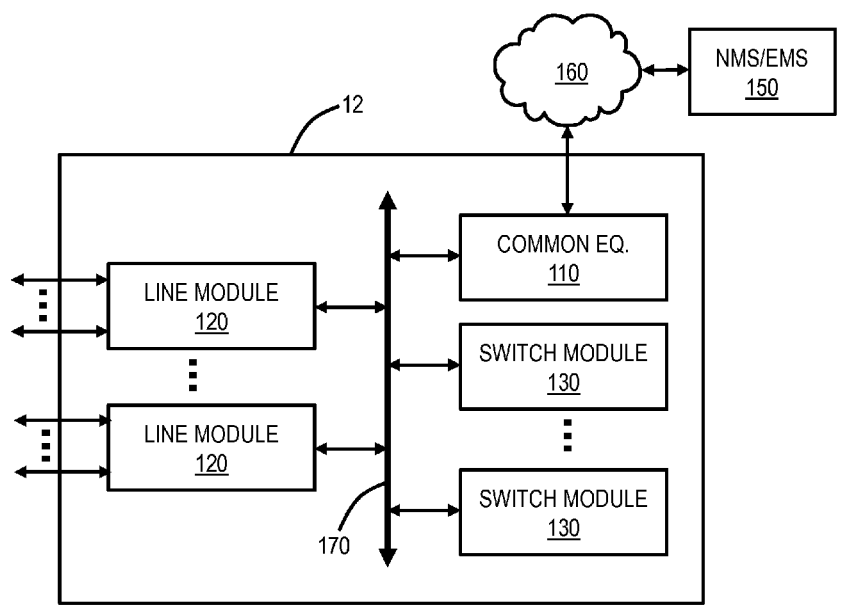
FIG. 6 is a block diagram of an exemplary node for use with the systems and methods described herein.
Figure 7:
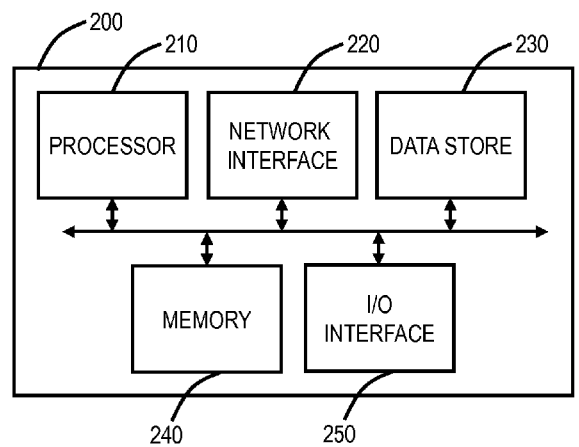
FIG. 7 is a block diagram of a controller to provide control plane processing and/or operations, administration, maintenance, and provisioning (OAM&P) for the node of FIG. 6.

An exemplary implementation of a node 12 is illustrated in FIG. 6. Each of the nodes 12 can include a controller (an exemplary implementation of a controller is illustrated in FIG. 7) which can include a call connection database. In the systems and methods described herein, a list of call connections on a link/line can be retrieved based on looking up all the associated call control connection points on the link/line. This lookup can be on managed objects located in storage and accessible by the controller. The systems and methods enable visibility of these managed objects at intermediate nodes for operations thereon as opposed to only at the originating node. A user can retrieve a connection list on any link/line. The connection list is a combination of originating node name and connection ID (e.g., SNC ID), and this can maintain uniqueness since connections may share connection ID, but have different originating nodes, i.e., no connection can have the same connection ID and the same originating node. Additionally, the systems and methods do not propose to alter the fact that the originating node is still responsible for call connection management. Instead, the systems and method enable the intermediate node to signal the originating node for any operations in the call connection management thereby leveraging and preserving existing operation by the originating node. In this manner, the systems and methods can be realized in the control plane 16 with minor modifications, e.g., adding additional data in existing control plane messages.

Figure 2:
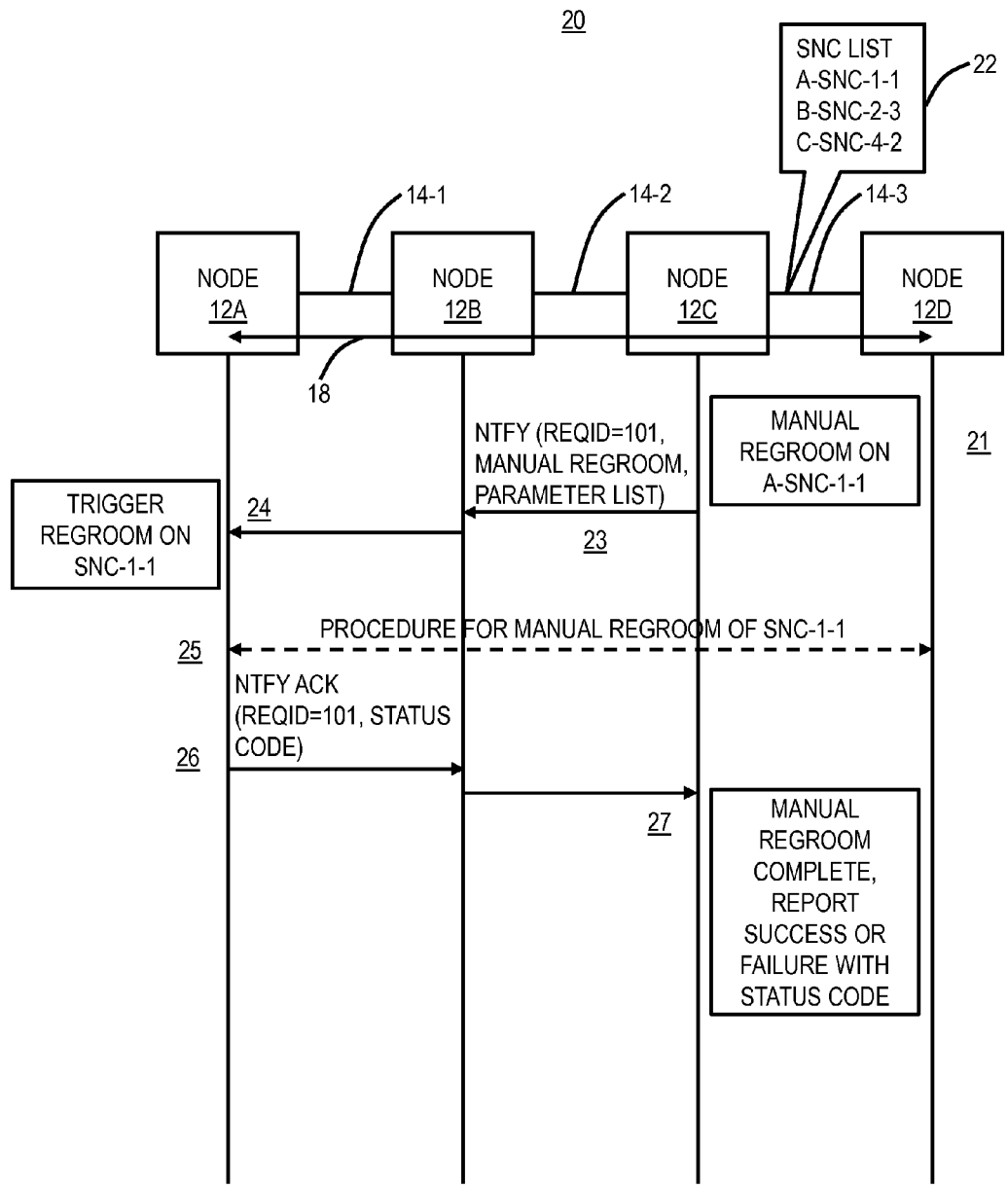
FIG. 2 is a timing diagram of an SNC regroom operation triggered from an intermediate node (i.e., a non-originating node)

Referring to FIG. 2, in an exemplary embodiment, a timing diagram illustrates an SNC regroom operation 20 triggered from an intermediate node (i.e., a non-originating node). Specifically, the SNC regroom operation 20 is illustrated with respect to the SNC 18 in the network 10. The timing diagram illustrates the nodes 12A, 12B, 12C, 12D connected by the links 14-1, 14-2, 14-3 and different operations shown in a vertical direction. The SNC regroom operation 20 is presented to illustrate an exemplary operation of the systems and methods. Again, a user can trigger operations including Manual Regroom, Revert, Switch to Protect and Configure from a non-originating node from where the SNC traverses. The SNC regroom operation 20 illustrates how a manual regroom operation is triggered from the node 12C on the SNC 18 (e.g., referred to as SNC-1-1) originating on the node 12A and terminating on the node 12D. Note, the user can perform the steps described herein via a network management system (NMS), an element management system (EMS), a direct login to the controller, an SDN controller, a Path Computation Element (PCE), etc.

In the SNC regroom operation 20, at a time 21, a manual regroom operation is selected at the node 12C and on the link 14-3. Again, the manual regroom operation can be selected by a user via the NMS, EMS, etc. The node 12C retrieves a connection list 22 of the SNCs on the link 14-3 which include A-SNC-1-1, B-SNC-2-3, and C-SNC-4-2. The manual regroom operation is shown for illustration on the SNC 18 (A-SNC-1-1). At a time 23, a notify (NTFY) message is sent towards the originating node with request ID, operation type and parameter list. For example, the originating node for the SNC 18 is the node 12A, the request ID can be 101, and the operation type can be manual regroom. The NTFY message is sent from the node 12C to the node 12A through the node 12B. Upon receiving the NTFY message at a time 24, the node 12A, as the originating node, implements a manual regroom of the SNC 18 at a time 25. Here, the node 12A can implement standard functionality of the control plane for the manual regroom. Subsequent to completion at a time 26, a NTFY acknowledgement (ACK) message is sent to the node 12C with a status code and it is received at a time 27 and the node 12C is notified of the successful manual regroom.

Figure 3:
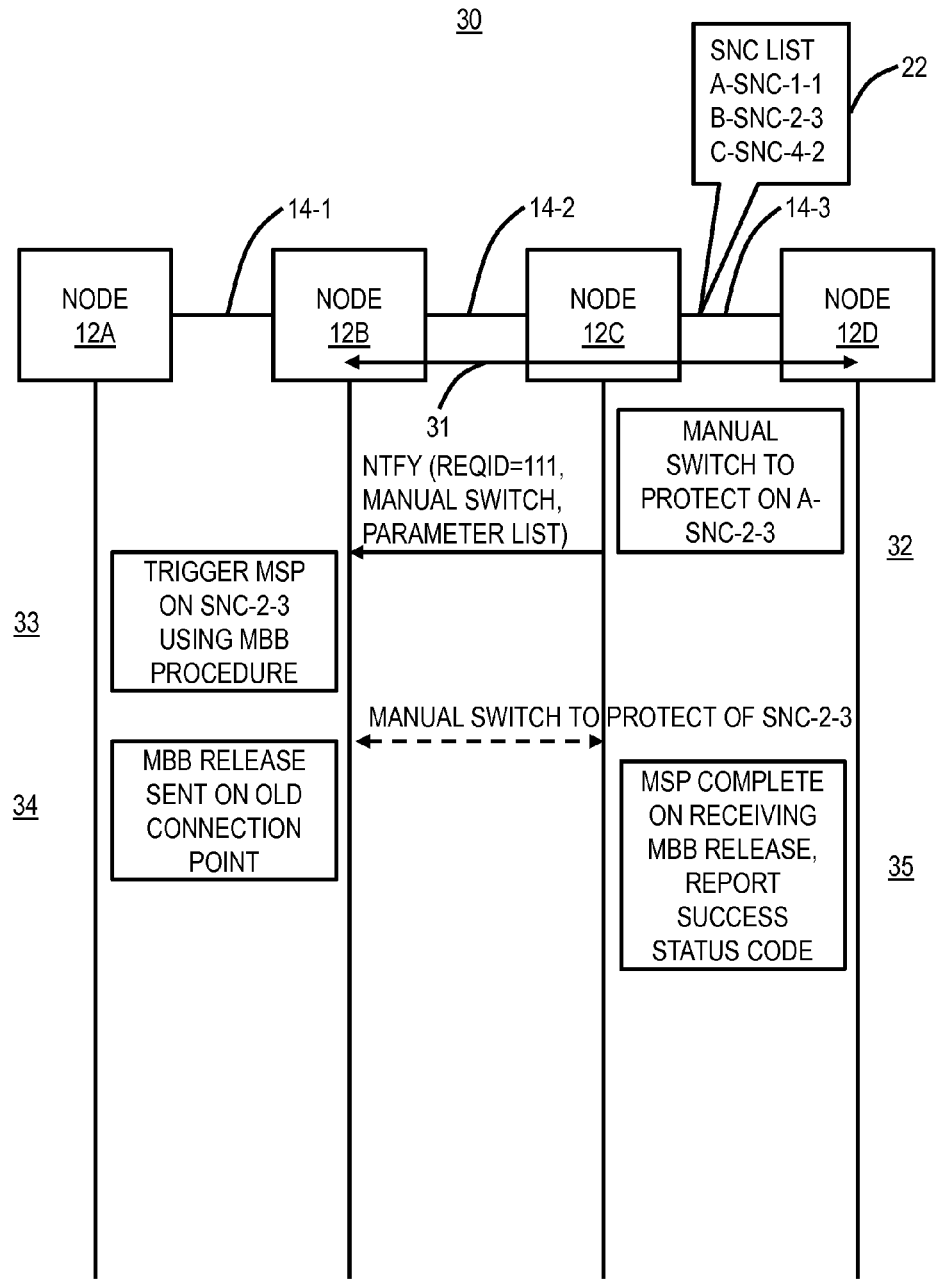
FIG. 3 is a timing diagram of an SNC MSP operation triggered from an intermediate node (i.e., a non-originating node)

Referring to FIG. 3, in an exemplary embodiment, a timing diagram illustrates an SNC MSP operation 30 triggered from an intermediate node (i.e., a non-originating node). As in FIG. 2, the SNC MSP operation 30 is illustrated on the same nodes 12A, 12B, 12C, 12D. Here, the SNC MSP operation 30 is on an SNC 31 which is the B-SNC-2-3. Similar to the SNC regroom operation 20, the SNC MSP operation 30 obtains the connection list 22 and an SNC MSP operation is selected on the SNC 31 at time 32. The node 12C sends a NTFY message at the time 32 to the node 12B with an associated request ID, manual switch, and parameter list. The node 12B receives the NTFY message and triggers a MSP operation at time 33. Here, the node 12B can implement standard functionality of the control plane for the manual switch to protect. Subsequently, the node 12B sends a release at time 34 on the old connection point and the node 12D receives the release at time 35 signifying the success of the MSP with associated status code.

The systems and methods include searching call objects on the links 14 associated with intermediate nodes, using existing control plane messaging with modifications to signal the originating node, and the originating node performing the requested operation. That is, on receiving a user request on a call connection, the connection point in the direction of originating node is searched and a NTFY message is sent to the originating node. The NTFY message has following Information Elements a) Request ID—A unique identifier for the connection point to associate it with NTFY ACK received, and this also addresses back-to-back user requests which can either be rejected or sent to the originating node to be queued; b) Operation Type which is an enumeration of specific user operation requested; and c) Parameter List—some operation like Configure, Manual Regroom with parameters require additional IEs to propagate the attribute list. The proposed operations can be extended to any valid user initiated operation on an in service connection (e.g., SNC or LSP) and exemplary operations can include for SNCs:

```
NON_ORIG_SNC_MANUAL_REGROOM
NON_ORIG_SNC_MANUAL_REGROOM_RHP
(Reserved Home Path)
NON_ORIG_SNC_MANUAL_REGROOM_SNC_TYPE
NON_ORIG_SNC_MANUAL_REGROOM_TCM
(Tandem Connection Monitoring)
NON_ORIG_SNC_MANUAL_REVERT
NON_ORIG_SNC_MANUAL_SWITCH
NON_ORIG_SNC_CONFIGURE
```

On receiving the request at the originating node, the SNC operation is triggered internally by issuing it to the SNC object at originating node, e.g., using standard techniques for call control management by the originating node. If the path remains the same subsequent to the SNC operation, a NTFY ACK with status code is sent which is indicates success/failure at the node triggering the call connection edit operation. If there is a change in path, the release message received at the connection on the intermediate node is used for reporting success/failure. For example, managed objects for cross connects are described in ITU-T M.2100 "Generic network information model" (April 2005), the contents of which are incorporated by reference herein. Also, for example, the operation by the originating node can be a make before break (MBB) operation or the like. Managed objects are abstract representations of network resources that are managed.

Figure 4:
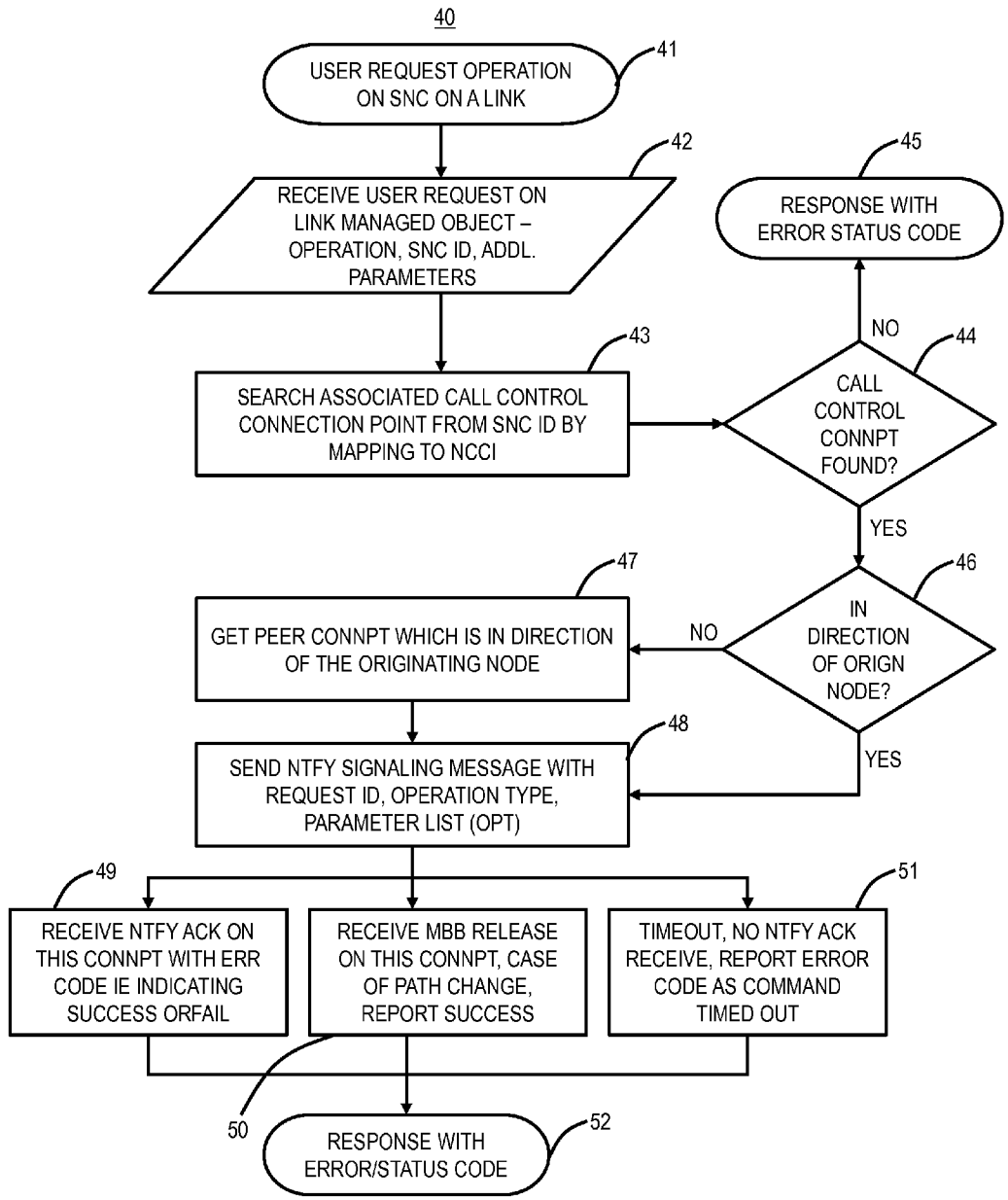
FIG. 4 is a flowchart of a method for control flow based on a non-originating node triggering a call connection operation.

Referring to FIG. 4, in an exemplary embodiment, a flowchart illustrates a method 40 for control flow based on a non-originating node triggering a call connection operation. The method 40 contemplated operation in the network 10 or the like. For example, the method 40 can be implemented via the nodes 12 or the like using an associated control plane (e.g., ASON, GMPLS, OSRP, etc. where call control management is performed by the originating node of a call). The method 40 focuses on activity at the non-originating node. Again, for illustration purposes, the method 40 is described with respect to an SNC connection (which is used in ASON and OSRP), and the method 40 also contemplates operation on an LSP (for GMPLS). The method 40 includes a user requesting an operation on an SNC on a link (step 41). This request can be via an NMS, EMS, PCE, etc. The method 40 includes receiving the user request on a link managed object and retrieving associated data (operation, SNC ID, additional parameters) on the link at the non-originating node (step 42). The method 40 includes the non-originating node searching the data for the associated call control connection point based on the SNC ID by mapping to NCCI (step 43).

If the call control connection point is not found (step 44), the method 40 ends and responds with an error status code, e.g., connection point not found (step 45). If the call connection point is found (step 44), the method 40 checks if the call connection point is in the direction of the originating node (step 46). Note, in most cases, connections like SNCs are bi-directional, so the call connection point can be either in the direction of the originating node or in the opposite direction. If the found call connection point is in the opposite direction of the originating node (step 46), the method 40 includes getting a peer call connection point which is in the direction of the originating node (step 47). Subsequent to step 47 and if the found call connection point is in direction of the originating node, the method 40 include sending a NTFY signaling message with a request ID, operation type, and optional parameter list to the originating node (step 48). At this point, the non-originating node waits for a response from the originating node. The response can include receiving a NTFY ACK on this connection point with an error code IE indicating success or failure (step 49), receiving a MBB release on this connection point in case of a path change with the release including the report of success (step 50), or having a timeout, i.e., no NTFY ACK is received for a predetermined time, which results in reporting an error code as command timed out (step 51). Subsequently, the method 40 ends with the appropriate error/status code relayed (step 52).

Figure 5:
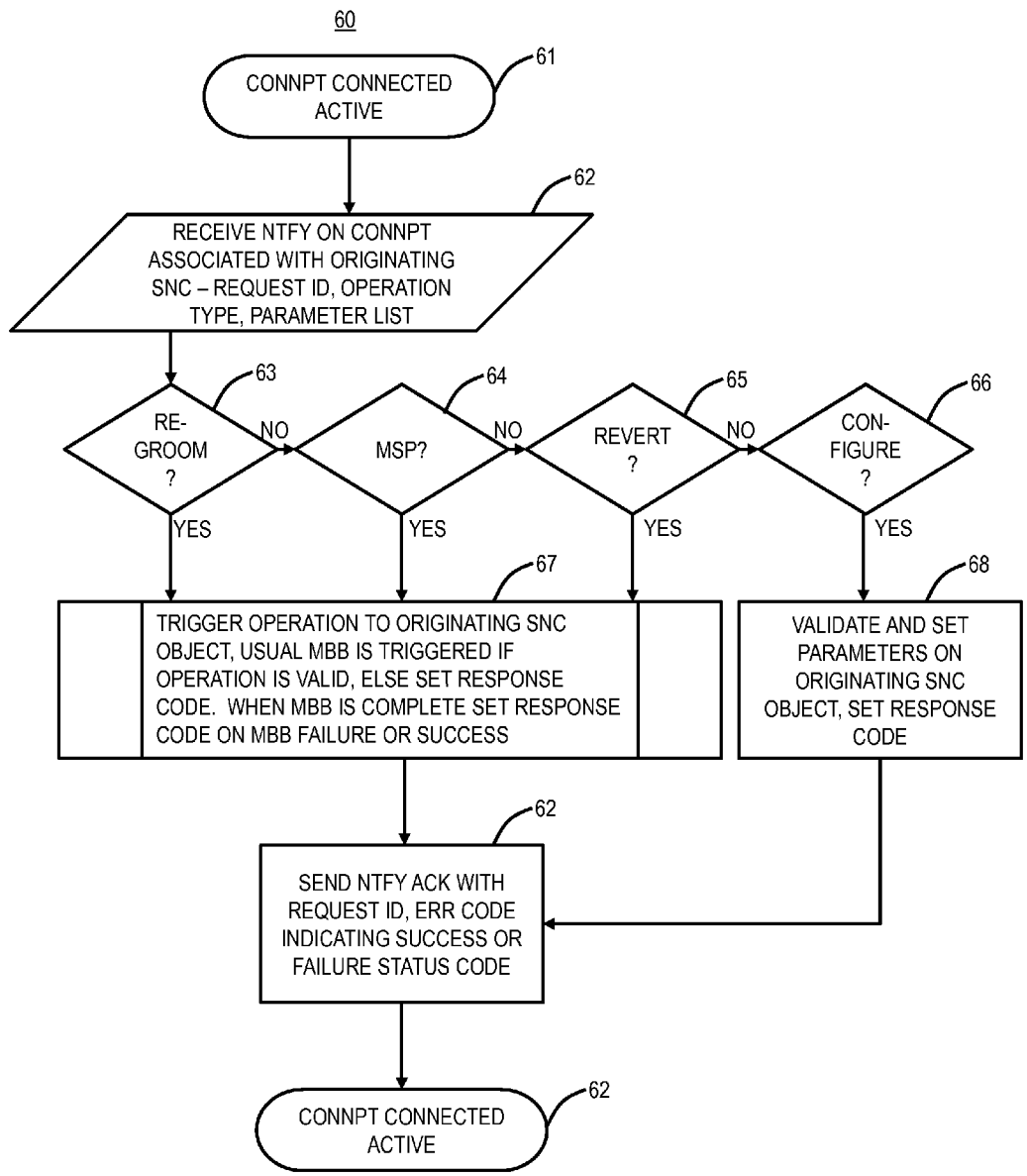
FIG. 5 is a flowchart of a method for control flow based on an originating node receiving triggering from a non-originating node for a call connection operation.

Referring to FIG. 5, in an exemplary embodiment, a flowchart illustrates a method 60 for control flow based on an originating node receiving triggering from a non-originating node for a call connection operation. The method 60 contemplated operation in the network 10 or the like. For example, the method 60 can be implemented via the nodes 12 or the like using an associated control plane (e.g., ASON, GMPLS, OSRP, etc. where call control management is performed by the originating node of a call). The method 60 focuses on activity at the originating node in response to the NTFY message in the method 40; thus the methods 40, 60 contemplate operation together. Again, for illustration purposes, the method 60 is described with respect to an SNC connection (which is used in ASON and OSRP), and the method 40 also contemplates operation on an LSP (for GMPLS).

The method 60 includes the connection point for the SNC being active (step 61), and the originating node receives a NTFY message on the connection point associated with the originating SNC along with the request ID, operation type, and optional parameter list (step 62). The method 60 checks the operation type (steps 63-66) which can include regroom, MSP, revert, configured, etc. If the operation type is regroom, MSP, or revert, the method 60 includes triggering an operation to an originating SNC object, usually MBB is triggered if operation is valid, else the method 60 sets the response code accordingly, and when MBB is complete, the method 60 sets the response code on MBB failure or success (step 67). If the operation type is configured, the method 60 includes validating and setting parameters on the originating SNC object, and setting the response code accordingly (step 68). Note, the systems and methods contemplated other operation types as well. Subsequent to the steps 67, 68, the method 60 sends a NTFY ACK with the request ID and error code indicating success or failure status code.

Referring to FIG. 6, in an exemplary embodiment, a block diagram illustrates an exemplary node 12 for use with the systems and methods described herein. In an exemplary embodiment, the exemplary node 12 can be a network element that may consolidate the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, and/or 2 consolidation. In another exemplary embodiment, the node 12 can be any of an OTN add/drop multiplexer (ADM), a multi-service provisioning platform (MSPP), a digital cross-connect (DCS), an optical cross-connect, an optical switch, a router, a switch, a wavelength division multiplexing (WDM) terminal, an access/aggregation device, etc. That is, the node 12 can be any digital system with ingress and egress digital signals and switching therebetween of channels, timeslots, tributary units, etc. While the node 12 is generally shown as an optical network element, the systems and methods contemplated for use with any switching fabric, network element, or network based thereon.

In an exemplary embodiment, the node 12 includes common equipment 110, one or more line modules 120, and one or more switch modules 130. The common equipment 110 can include power; a control module; operations, administration, maintenance, and provisioning (OAM&P) access; user interface ports; and the like. The common equipment 110 can connect to a management system 150 through a data communication network 160 (as well as a Path Computation Element (PCE), Software Defined Network (SDN) controller, OpenFlow controller, etc.). The management system 150 can include a network management system (NMS), element management system (EMS), or the like. Additionally, the common equipment 110 can include a control plane processor, such as a controller 200 illustrated in FIG. 7, configured to operate the control plane as described herein. The node 12 can include an interface 170 for communicatively coupling the common equipment 110, the line modules 120, and the switch modules 130 therebetween. For example, the interface 170 can be a backplane, mid-plane, a bus, optical or electrical connectors, or the like. The line modules 120 are configured to provide ingress and egress to the switch modules 130 and to external connections on the links 14 to/from the node 12. In an exemplary embodiment, the line modules 120 can form ingress and egress switches with the switch modules 130 as center stage switches for a three-stage switch, e.g. a three stage Clos switch. Other configurations and/or architectures are also contemplated. The line modules 120 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, etc.

Further, the line modules 120 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between. The line modules 120 can include wavelength division multiplexing interfaces, short reach interfaces, and the like, and can connect to other line modules 120 on remote network elements, end clients, edge routers, and the like, e.g. forming connections on the links 14. From a logical perspective, the line modules 120 provide ingress and egress ports to the node 12, and each line module 120 can include one or more physical ports. The switch modules 130 are configured to switch channels, timeslots, tributary units, packets, etc. between the line modules 120. For example, the switch modules 130 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 130 can include Time Division Multiplexed (TDM) (i.e., circuit switching) and/or packet switching engines. The switch modules 130 can include redundancy as well, such as 1:1, 1:N, etc. In an exemplary embodiment, the switch modules 130 provide OTN switching and/or Ethernet switching.

Those of ordinary skill in the art will recognize the node 12 can include other components which are omitted for illustration purposes, and that the systems and methods described herein are contemplated for use with a plurality of different network elements with the node 12 presented as an exemplary type of network element. For example, in another exemplary embodiment, the node 12 may not include the switch modules 130, but rather have the corresponding functionality in the line modules 120 (or some equivalent) in a distributed fashion. For the node 12, other architectures providing ingress, egress, and switching therebetween are also contemplated for the systems and methods described herein. In general, the systems and methods described herein contemplate use with any network element providing switching of channels, timeslots, tributary units, wavelengths, etc. and using the control plane. Furthermore, the node 12 is merely presented as one exemplary node 12 for the systems and methods described herein.

In an exemplary embodiment, the node 12 can include a plurality of ports with at least one connection thereon (e.g., formed by the line modules 120); and a controller communicatively coupled to the plurality of ports and operating a control plane, wherein, for an operation of call connection management on the at least one connection, the controller is configured to: if the node is a non-originating node for the at least one connection: determine information associated with the at least one connection on a link; and signal an originating node of the at least one connection based on the information and the operation to perform the call connection management on the at least one connection; and if the node is the originating node for the at least one connection: receive a signaling message from the non-originating node and perform the call connection management based thereon; and signal a status to the non-originating node.

Referring to FIG. 7, in an exemplary embodiment, a block diagram illustrates a controller 200 to provide control plane processing and/or operations, administration, maintenance, and provisioning (OAM&P) for the node 12. The controller 200 can be part of common equipment, such as common equipment 110 in the node 12, or a stand-alone device communicatively coupled to the node 12 via the DCN 160. The controller 200 can include a processor 210 which is hardware device for executing software instructions such as operating the control plane. The processor 210 can be any custom made or commercially available processor, a central processing unit (CPU), an auxiliary processor among several processors associated with the controller 200, a semiconductor-based microprocessor (in the form of a microchip or chip set), or generally any device for executing software instructions. When the controller 200 is in operation, the processor 210 is configured to execute software stored within memory, to communicate data to and from the memory, and to generally control operations of the controller 200 pursuant to the software instructions. The controller 200 can also include a network interface 220, a data store 230, memory 240, an I/O interface 250, and the like, all of which are communicatively coupled therebetween and with the processor 210.

The network interface 220 can be used to enable the controller 200 to communicate on the DCN 160, such as to communicate control plane information to other controllers, to the management system 150, and the like. The network interface 220 can include, for example, an Ethernet card (e.g., 10BaseT, Fast Ethernet, Gigabit Ethernet) or a wireless local area network (WLAN) card (e.g., 802.11). The network interface 220 can include address, control, and/or data connections to enable appropriate communications on the network. The data store 230 can be used to store data, such as control plane information, provisioning data, OAM&P data, etc. The data store 230 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 230 can incorporate electronic, magnetic, optical, and/or other types of storage media. The memory 240 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 240 may incorporate electronic, magnetic, optical, and/or other types of storage media. Note that the memory 240 can have a distributed architecture, where various components are situated remotely from one another, but may be accessed by the processor 210. The I/O interface 250 includes components for the controller 200 to communicate to other devices. Further, the I/O interface 250 includes components for the controller 200 to communicate with the other nodes, such as using overhead associated with OTN signals.

In an exemplary embodiment, the controller 200 is configured to communicate with other controllers 200 in the network 100 to operate the control plane for control plane signaling. This communication may be either in-band or out-of-band. For SONET networks and similarly for SDH networks, the controllers 200 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 200 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. In the present invention, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

The controller 200 is configured to operate the control plane in the network 100. That is, the controller 200 is configured to implement software, processes, algorithms, etc. that control configurable features of the network 100, such as automating discovery of the nodes 12, capacity on the links, port availability on the nodes 12, connectivity between ports; dissemination of topology and bandwidth information between the nodes 12; path computation and creation for connections; network level protection and restoration; and the like. As part of these functions, the controller 200 can include a topology database that maintains the current topology of the network 100 based on control plane signaling (e.g., HELLO messages) and a connection database that maintains available bandwidth on the links 14 again based on the control plane signaling. Again, the control plane is a distributed control plane; thus a plurality of the controllers 200 can act together to operate the control plane using the control plane signaling to maintain database synchronization. In source-based routing, the controller 200 at a source node for a connection is responsible for path computation and establishing by signaling other controllers 200 in the network 100. For example, the source node and its controller 200 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. Path computation generally includes determining a path, i.e. traversing the links 14 through the nodes 12 from the originating node to the destination node based on a plurality of constraints such as administrative weights on the links 14, bandwidth availability on the links 14, etc.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method for performing an operation at a non-originating node of a connection, comprising:
    receiving a request for the operation;
    determining information associated with the connection, wherein the determining is performed by searching, based on both a connection identifier and an originating node of the connection, managed objects stored at the non-originating node; and
    signaling, based on the information and the operation, the originating node to cause the originating node to perform call connection management on the connection.

2. The method of claim 1, wherein the operation comprises any one or more of regroom, manual switch to protect, revert, and configure.

3. The method of claim 1, wherein the signaling is performed through a control plane comprising any of Automatically Switched Optical Network (ASON), Generalized Multi-Protocol Label Switching (GMPLS), and Optical Signaling and Routing Protocol (OSRP).

4. The method of claim 3, wherein the control plane is configured such that the call connection management is performed by the originating node, and wherein the non-originating node performs the call connection management through the originating node.

5. The method of claim 3, wherein the signaling utilizes control plane signaling messages with data included therein in Information Elements to trigger the operation to perform the call connection management.

6. The method of claim 5, wherein the control plane signaling messages comprise notify messages or release messages.

7. The method of claim 1, wherein the connection identifier comprises a Network Call Correlation Identification (NCCI).

8. The method of claim 1, wherein the originating node performs the operation on the connection subsequent to receiving the signaling by the non-originating node; and the method further comprises:
receiving signaling from the originating node with one of a notification and a release based on the operation with a status included therein.

9. The method of claim 1, wherein the connection comprises one of a Subnetwork Connection (SNC) or a Label Switched Path (LSP).

10. The method of claim 1, wherein the request is received from a Software Defined Networking (SDN) controller.

11. The method of claim 1, wherein the operation is a manual switch to protect to free up bandwidth on a link.

12. A non-originating node, comprising:
a plurality of ports with at least one connection thereon; and
a controller communicatively coupled to the plurality of ports and operating a control plane, wherein, for an operation of call connection management on the at least one connection, the controller is configured to:
determine information associated with the at least one connection on a link formed by a port, wherein the non-originating node is configured to search through managed objects, based on both a connection identifier and an originating node of the at least one connection, to determine information associated with the at least one connection; and
signal, based on the information and the operation, the originating node of the at least one connection to perform the call connection management on the at least one connection.

13. The non-originating node of claim 12, wherein the operation comprises any one or more of regroom, manual switch to protect, revert, and configure.

14. The non-originating node of claim 12, wherein the control plane comprises any of Automatically Switched Optical Network (ASON), Generalized Multi-Protocol Label Switching (GMPLS), and Optical Signaling and Routing Protocol (OSRP); and
wherein the control plane is configured such that the call connection management is performed by the originating node, and wherein the non-originating node causes performance of the call connection management through the originating node.

15. The non-originating node of claim 12, wherein the non-originating node utilizes control plane signaling messages with data included therein in Information Elements to trigger the operation to perform the call connection management.

16. The non-originating node of claim 12, wherein, to perform the operation in the call connection management, the non-originating node is configured to:
determine information associated with the connection;
signal, based on the information and the operation, the originating node to perform the call connection management on the connection; and
receive a status signal from the originating node.

17. The non-originating node of claim 12, wherein the operation is a configure operation including any of changing a Tandem Connection Monitoring number of the connection, converting a Subnetwork Connection (SNC) to a Permanent SNC (PSNC) or mesh SNC, and editing any editable call connection parameters of the connection.

18. An originating node, comprising:
a plurality of ports with at least one connection thereon; and
a controller communicatively coupled to the plurality of ports and operating a control plane, wherein, for an operation of call connection management on the at least one connection, the controller is configured to:
receive a signaling message from a non-originating node on a port and perform the call connection management based thereon, wherein the non-originating node i) receives a request for the call connection management, ii) determines information associated with the at least one connection based on a search, based on both a connection identifier and the originating node of the at least one connection, managed objects stored at the non-originating node, and iii) signals the signaling message based thereon to the originating node; and
signal a status to the non-originating node.

* * * * *